UNITED STATES PATENT OFFICE.

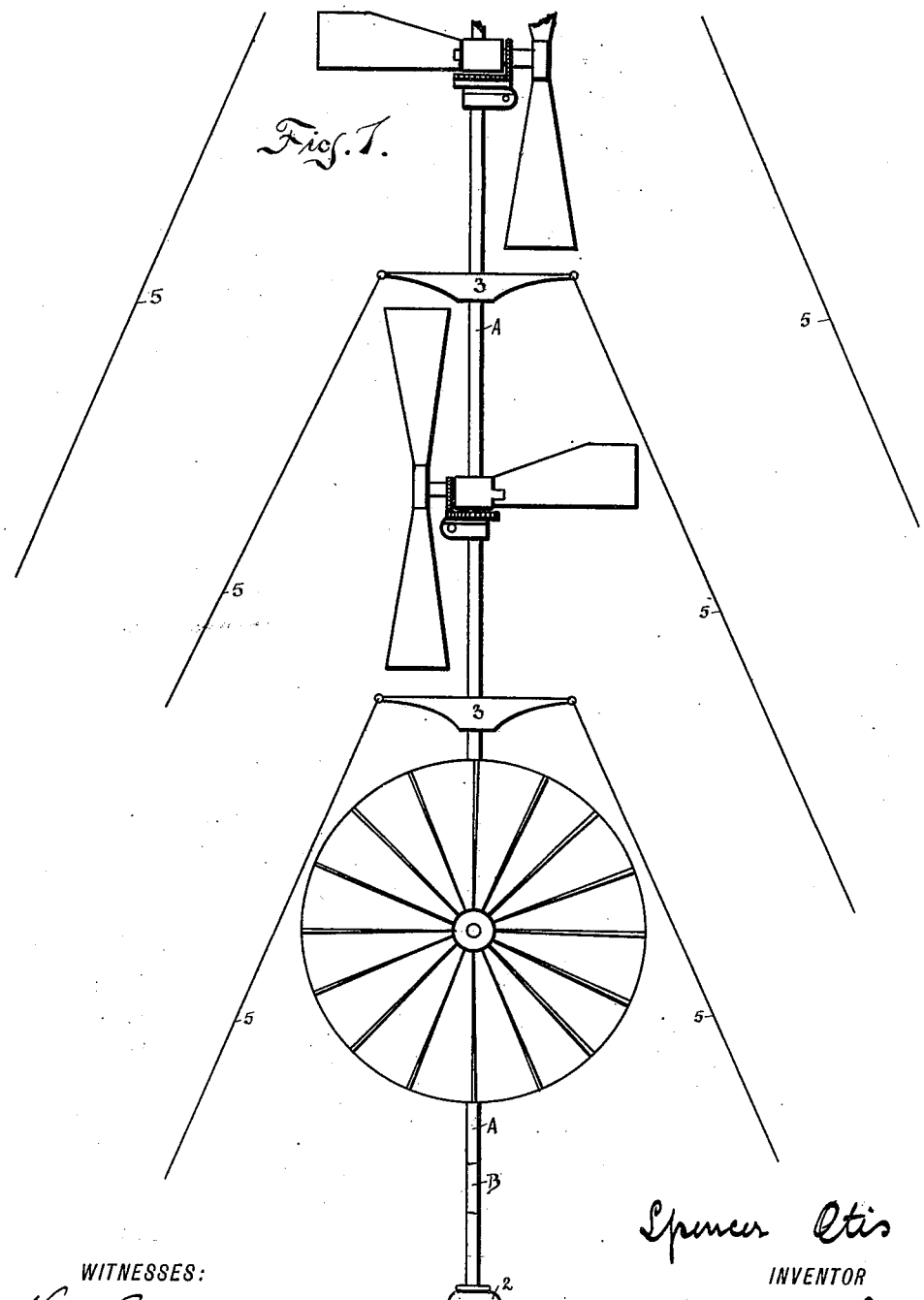

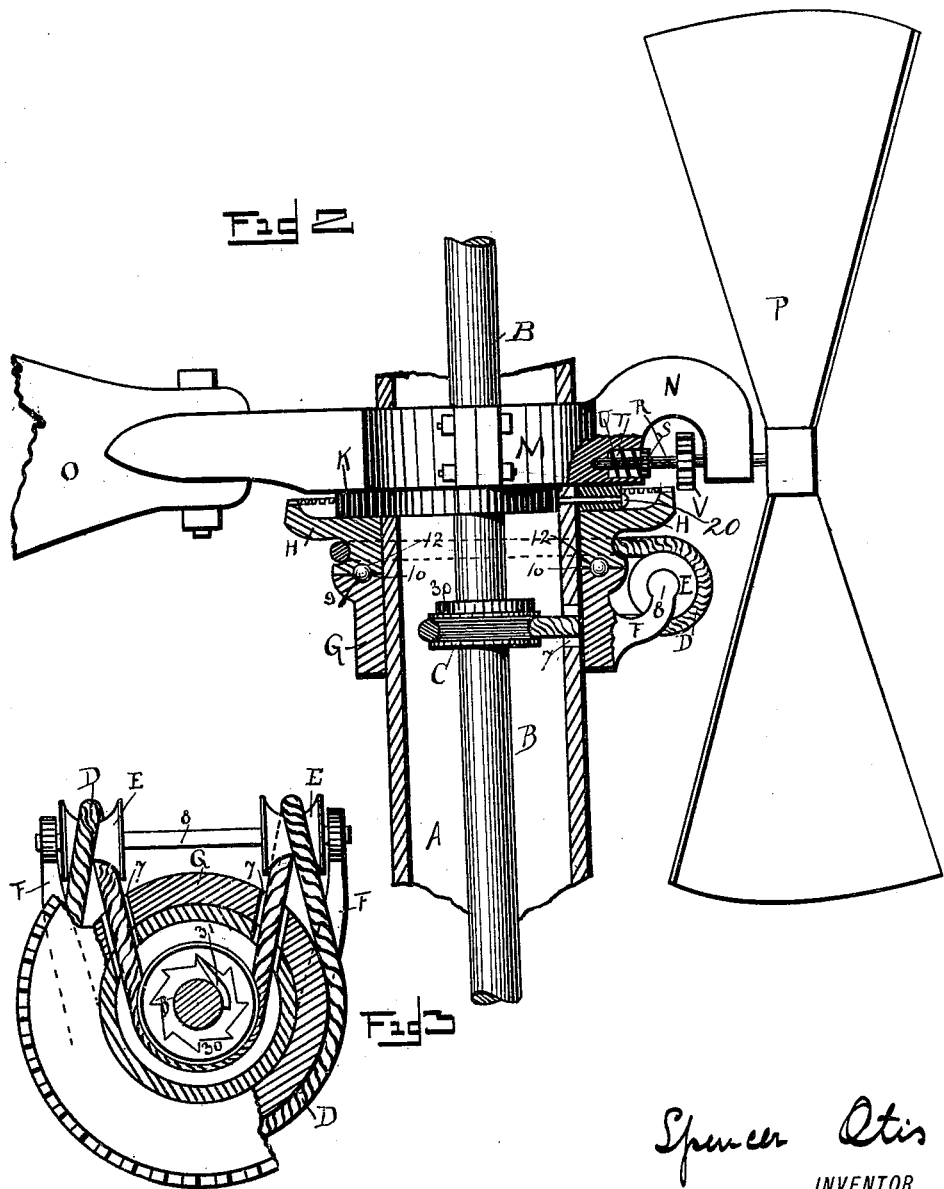

SPENCER OTIS, OF OMAHA, NEBRASKA.

MULTIPLE AERMOTOR.

SPECIFICATION forming part of Letters Patent No. 641,793, dated January 23, 1900.

Application filed June 25, 1897. Renewed July 8, 1899. Serial No. 723,194. (No model.)

*To all whom it may concern:*

Be it known that I, SPENCER OTIS, residing at Omaha, in the county of Douglas and State of Nebraska, have invented certain useful Improvements in Multiple Aermotors; and I do hereby declare that the following is a full, clear, and exact description of the invention, such as will enable others skilled in the art to which it appertains to make and use the same, reference being had to the accompanying drawings, which form a part of this specification.

This invention has relation to an improvement in multiple aermotors, the object of my invention being to provide an aermotor that shall comprise a series of superposed independently-working wind-wheels, which wheels shall be so arranged that they can revolve about the main operating-shaft, each wheel exerting its influence upon the main shaft, the wheels being so arranged that the superposed wheels can be actuated by air-currents passing in various directions.

In the accompanying drawings, Figure 1 shows an elevation of an aermotor embodying my invention, disclosing three superposed wheels, which wheels are shown as receiving air-currents coming from three different directions. Fig. 2 shows an enlarged broken and partly-sectional view of one of the wind-wheels and its connection to the main driving-shaft; while Fig. 3 shows an enlarged broken detail, partly in section, disclosing a plan view of the arrangement of the shaft.

My invention comprises, essentially, a main standard A, which is preferably tubular and mounted upon a base 2. This tubular standard is of considerable height, extending far beyond the windmill and wind-engine tower as originally constructed, the standard being provided at a suitable point with the cross-bars 3 3, from which are extended a system of guide-cables 5 5, which are suitably anchored and are arranged to perfectly brace and support this tubular standard. Working centrally within this standard is a main operating-shaft B, which shaft is rotated and which is placed in power of transmission with the pump or other machinery or device to be actuated. At several points a suitable distance above the surface of the earth I provide this main driving-shaft B with a series of pulleys C, which pulleys are securely attached to this shaft B and are adapted to receive either a belt or chain, as is shown in Fig. 2, where an ordinary wire cable E is shown. At a point immediately opposite these pulleys C, I provide the tubular standard A with two openings 7 7, referring now to Fig. 3, and opposite these openings 7 are positioned the guide-sheaves E, which are mounted upon a shaft 8, which shaft is held within the bracket-arms F, forming part of the collar G, which collar is secured to and forms part of the standard A. This collar G is preferably provided with a ball-race 9, within which are held a number of balls 10 to form an antifriction-bearing and which balls are adapted to receive the crown-gear H, which gear is provided with a ball-race 12, as shown. This crown-gear works loose about the standard A and is supported by means of the collar G.

Fixed to the standard A above the crown-gear H is a collar K, secured by means of a pin 20, and which collar supports the sleeve M, provided with the gooseneck N, to which is secured an ordinary vane O at one end and at the other an ordinary wind-wheel P, which latter wheel is supported by means of the shaft R, which shaft works within the gooseneck N and is provided with the collar S, working within an opening T of the gooseneck N, within which is held a spring U, as shown. This shaft R is further provided with a pinion V, adapted to mesh with the crown-gear H, as is shown in Fig. 2.

The cable D, which is adapted to pass over the pulley C and the sheaves E E, finally works about the crown-gear H, so that as this crown-gear actuates the cable H the main shaft B is actuated by means of the pulley C.

Normally and in a very light breeze if thrown in the wind the wheel P will revolve until the pressure will be great enough to overcome the tension of the spring U to bring about the meshing of the wheels V and H, which throws the engine into operation.

The connection between the shaft B and the wheel C is made by means of the ratchet 30, adapted to engage a spring 31, secured to the shaft B, as is shown in Fig. 3, the ratchet 30 being actuated against this spring to revolve the shaft.

Now the aim of my invention is to provide a tower of a suitable height, so that a number of superposed wind-wheels may be employed. As shown, it will be noticed that these wind-wheels can be carried in a circle about the tubular standard by virtue of their revolving upon the collar K, it being immaterial at what point the gears V and H mesh, and so, also, can these wind-wheels revolve about the standard, even though the gears H and V are meshing. Now should these wind-wheels, which are intended to be extended a considerable height, be within different air-currents each wheel would be actuated and carried in a proper position within the bearing controlling the same irrespective of the wind-wheel above or below, the force of each wheel being exerted upon the main shaft E. Should, for instance, all the wheels within different strata of air be actuated and revolved at a like speed, they will all exert their power upon the main driving-shaft; but should one wheel be actuated much faster than the others the fastest wheel would revolve the shaft B much faster than the remaining wind-wheels, so that the spring 31 would pass over the ratchet, which ratchet, however, might be going in the same direction until the wheels are brought into a like speed.

Now, having thus described my said invention, what I claim as new, and desire to secure by United States Letters Patent, is—

1. In a multiple aermotor the combination with a suitable standard of supports for said standard a shaft within said standard clutch-wheels upon said shaft independently working superposed wind-wheels belt connection between said wind-wheels and clutch-wheels the relation between said shaft and clutch-wheels being such that said shaft may revolve in the working direction independent of said clutch mechanisms each of said wind-wheels being arranged to operate independently and in such a manner that one may ride dead while the others are working, all substantially as and for the purpose set forth.

2. In an aermotor the combination of the following instrumentalities, to wit: the tubular standard A, the shaft B, working within said standard A, the pulley C secured to said shaft and working within said standard A, said standard A being provided with openings opposite said pulleys, the guide-sheave E secured upon the outside to said standard adjacent to said openings, the collar G, secured to said standard, the crown-gear H supported by said collar G and loosely working about said standard, the fixed collar K above said crown-gear, the sleeve M removably supported about said standard and upon said collar, and provided with the downwardly-curved gooseneck N provided with the seating T, the vane O, secured to said collar opposite said gooseneck, the shaft R working within the lower end of the said gooseneck and passing through said seating T, the spring U upon said shaft R and working within said seating and against said collar S, the cable D working over and connecting said pulley C and crown-gear H, and the pinion V secured to said shaft R and adapted to engage said crown-gear, as in manner set forth.

In testimony whereof I affix my signature in presence of two witnesses.

SPENCER OTIS.

Witnesses:
G. W. SUES,
G. W. PADDOCK.